(12) United States Patent
Wu et al.

(10) Patent No.: US 10,425,841 B2
(45) Date of Patent: Sep. 24, 2019

(54) RS SNR REPORTING AND RECEIVING METHOD AND APPARATUS

(71) Applicant: Huawei Technologies Co., Ltd., Shenzhen (CN)

(72) Inventors: Tong Wu, Shenzhen (CN); Jie Cui, Shenzhen (CN); Hong Li, Beijing (CN); Anjian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/235,802

(22) Filed: Aug. 12, 2016

(65) Prior Publication Data
US 2016/0353295 A1     Dec. 1, 2016

Related U.S. Application Data

(63) Continuation of application No. PCT/CN2014/072022, filed on Feb. 13, 2014.

(51) Int. Cl.
*H04W 24/02* (2009.01)
*H04W 76/27* (2018.01)
(Continued)

(52) U.S. Cl.
CPC ............ *H04W 24/02* (2013.01); *H04L 5/006* (2013.01); *H04L 5/0007* (2013.01);
(Continued)

(58) Field of Classification Search
CPC .......... H04W 72/085; H04W 72/1231; H04W 36/30; H04W 36/0088; H04W 36/0094;
(Continued)

(56) References Cited

U.S. PATENT DOCUMENTS

2011/0306345 A1   12/2011   Wu
2011/0310879 A1   12/2011   Wu et al.
(Continued)

FOREIGN PATENT DOCUMENTS

CN    101110986 A    1/2008
CN    101888646 A    11/2010
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 349 pages.
(Continued)

*Primary Examiner* — George Eng
*Assistant Examiner* — Umair Ahsan
(74) *Attorney, Agent, or Firm* — Leydig, Voit & Mayer, Ltd.

(57) ABSTRACT

The present invention relates to the field of mobile communications technologies, and in particular, to an RS SNR reporting and receiving method, a terminal, and a base station, where the method comprises: sending, by the terminal, a user capability message to a serving base station, where the user capability message carries capability information of measuring and reporting an RS SNR by the terminal; and sending, by the serving base station, a measurement result reporting instruction message to the terminal based on the user capability message, and then reporting, to the serving base station, an RS SNR obtained by means of measurement.

20 Claims, 6 Drawing Sheets

Send a user capability message to a serving base station, where the user capability message carries capability information of measuring and reporting an RS SNR by a terminal — 100

Receive a measurement result reporting instruction message sent by the serving base station based on the user capability message — 110

Report, to the serving base station, an RS SNR obtained by means of measurement — 120

(51) Int. Cl.
*H04L 5/00* (2006.01)
*H04W 72/04* (2009.01)
*H04W 24/10* (2009.01)

(52) U.S. Cl.
CPC .......... *H04L 5/0051* (2013.01); *H04W 24/10* (2013.01); *H04W 72/048* (2013.01); *H04W 76/27* (2018.02)

(58) Field of Classification Search
CPC ........ H04W 36/0016; H04W 36/0005; H04W 24/10; H04W 24/02; H04W 24/04; H04W 24/08; H04W 48/20; H04L 5/0073; H04L 5/0007; H04L 5/006
See application file for complete search history.

(56) References Cited

U.S. PATENT DOCUMENTS

| | | | | |
|---|---|---|---|---|
| 2012/0004010 A1* | 1/2012 | Tamura | ............... | H04W 24/10 455/525 |
| 2012/0282916 A1* | 11/2012 | Futaki | ............... | H04W 24/10 455/422.1 |
| 2013/0188510 A1* | 7/2013 | Siomina | ............... | H04W 24/10 370/252 |
| 2014/0112173 A1* | 4/2014 | Hammarwall | ........ | H04W 24/10 370/252 |
| 2014/0112184 A1* | 4/2014 | Chai | ............... | H04L 5/0091 370/252 |
| 2014/0162642 A1 | 6/2014 | Kwon et al. | | |
| 2014/0334371 A1* | 11/2014 | Kim | ............... | H04W 52/0206 370/311 |
| 2015/0050939 A1* | 2/2015 | Futaki | ............... | H04W 24/08 455/452.1 |
| 2015/0103770 A1* | 4/2015 | Chang | ............... | H04W 76/027 370/329 |
| 2015/0156664 A1 | 6/2015 | Tsuda et al. | | |

FOREIGN PATENT DOCUMENTS

| | | |
|---|---|---|
| CN | 101998585 A | 3/2011 |
| CN | 103179670 A | 6/2013 |
| CN | 103229530 A | 7/2013 |
| EP | 2512170 A1 | 10/2012 |
| EP | 2624608 A1 | 8/2013 |
| EP | 2763454 A1 | 8/2014 |
| JP | 2011504706 A | 2/2011 |
| JP | 2012005123 A | 1/2012 |
| JP | 2015516774 A | 6/2015 |
| WO | 2010096961 A1 | 9/2010 |
| WO | 2012/149651 A1 | 11/2012 |
| WO | 2013/021832 A1 | 2/2013 |
| WO | 2013/047835 A1 | 4/2013 |
| WO | 2013/107414 A1 | 7/2013 |
| WO | 2013169061 A1 | 11/2013 |
| WO | 2014013768 A1 | 1/2014 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", 3GPP TS 37.320 V11.3.0, Mar. 2013, 23 pages.

3rd Generation Partnership Project; Technical Specification Group Radio Access Network; Evolved Universal Terrestrial Ratio Access (E-UTRA); Requirements for support of radio resource management (Release 12), 3GPP TS 36.133 V12.2.0, Dec. 2013, 815 pages.

"3rd Generation Partnership Project; Technical Specification Group Services and System Aspects; Telecommunication management; Subscriber and equipment trace; Trace control and configuration management (Release 12)", 3GPP TS 32.422 V12.0.0, Dec. 2013, 134 pages.

"Initial simulation results comparing different E-UTRA UE DL measurement quantities", Nokia, 3GPP TSG-RAN WG1 Meeting #47bis, Jan. 15-19, 2007, 4 pages, R1-070404.

"Consideration on the introduction of SINR Measurement", CMCC, 3GPP TSG-RAN WG2 Meeting #83, Aug. 19-23, 2013, 3 pages, R2-132329.

"Introducing RS-SINR in the specifications", Qualcomm Incorporated et al., 3GPP TSG-RAN Meeting #62, Dec. 3-6, 2013, 2 pages, RP-131842.

* cited by examiner

RS SNR REPORTING AND RECEIVING METHOD AND APPARATUS

CROSS-REFERENCE TO RELATED APPLICATIONS

This application is a continuation of International Application No. PCT/CN2014/072022, filed on Feb. 13, 2014, which is hereby incorporated by reference in its entirety.

TECHNICAL FIELD

The present invention relates to the field of communications technologies, and in particular, to an RS SNR reporting and receiving method, a terminal, and a base station.

BACKGROUND

With development of communications technologies, a high data transmission rate and a high service coverage rate are extremely important in a mobile communications system. For an increase in a data transmission rate and a service coverage rate of the mobile communications system, network optimization needs to be constantly performed on a network, so as to provide a user with wireless communication link quality that meets a quality of service (QoS) requirement.

A measurement value of a user terminal is an important parameter for directly reflecting the wireless communication link quality. In an Long Term Evolution (LTE) system, currently introduced measurement values used for radio resource management (RRM) mainly include: reference signal received power (RSRP) and reference signal received quality (RSRQ). A physical meaning of the RSRP is an average linear power value of cell-specific reference signals, in measured bandwidth, received on resource element (RE) that carry the cell-specific reference signals; a physical meaning of the RSRQ is all calculated received power (including a power sum of a wanted signal, interference, and noise) on orthogonal frequency division multiplexing (OFDM) symbols that carry the cell-specific reference signals in measured bandwidth, where the power sum is represented by using an received signal strength indicator (RSSI), a ratio of the RSRP to the RSSI represents a ratio of the wanted signal to all the received power, and indirectly reflects the wireless communication link quality.

In actual application, in the LTE system, user equipment (UE) performs mobility determining such as switching, cell selection, and cell reselection according to RSRP and RSRQ that are of a serving cell, an intra-frequency neighboring cell, and an inter-frequency neighboring cell.

However, in actual network planning and network optimization, RSRP and RSRQ cannot truly reflect downlink or uplink transmission link quality. Therefore, transmission link quality determined according to the RSRP and the RSRQ has a large error and low accuracy.

SUMMARY

Embodiments of the present invention provide an RS SNR reporting and receiving method, a terminal, and a base station, to resolve a problem in the prior art that determined transmission link quality has a large error and low accuracy.

Specific technical solutions provided in the embodiments of the present invention are as follows:

According to a first aspect, a reference signal signal-to-noise ratio RS SNR reporting method is provided, including:

sending a user capability message to a serving base station, where the user capability message carries capability information of measuring, recording, and reporting an RS SNR by a terminal;

receiving a measurement result reporting instruction message sent by the serving base station based on the user capability message; and reporting, to the serving base station, an RS SNR obtained by means of measurement.

With reference to the first aspect, in a first possible implementation manner, the RS SNR is a ratio of an average linear power value of reference signals RSs that are sent by a target base station and that are received on resource elements REs carrying the RSs to a sum of an average linear power value of signals that are sent by at least one non-target base station and that are received on orthogonal frequency division multiplexing OFDM symbols carrying the RSs.

With reference to the first aspect or the first possible implementation manner of the first aspect, in a second possible implementation manner, the user capability message is an evolved universal terrestrial wireless network E-UTRAN radio resource control RRC message.

With reference to the first aspect or the first and the second possible implementation manners of the first aspect, in a third possible implementation manner, the RS SNR is obtained by means of measurement in the following manner:

receiving a measurement instruction message sent by the serving base station, where the measurement instruction message carries information instructing the terminal to measure an RS SNR of a transmission link between the terminal and the target base station; and measuring the RS SNR of the transmission link between the terminal and the target base station according to the measurement instruction message.

With reference to the third possible implementation manner of the first aspect, in a fourth possible implementation manner, after the measuring the RS SNR of the transmission link between the terminal and the target base station, the method further includes:

sending a measurement complete indication message to the serving base station, where the measurement complete indication message carries information indicating that measurement of the RS SNR of the transmission link between the terminal and the target base station is completed.

With reference to the third or the fourth possible implementation manner of the first aspect, in a fifth possible implementation manner, the measurement instruction message is a logged measurement configuration message, and the measurement complete indication message is an RRC connection reconfiguration complete message.

With reference to the first aspect or the first to the fourth possible implementation manners of the first aspect, in a sixth possible implementation manner, the measurement result reporting instruction message carries information about the RS SNR reported by the terminal, where the information about the RS SNR reported by the terminal is included in information about all measurement values reported by the terminal, and all the measurement values include at least a measurement value of the RS SNR; or the information about the RS SNR reported by the terminal is included in information about a specified measurement value reported by the terminal, and the specified measurement value includes at least a measurement value of the RS SNR.

With reference to the first aspect or the first to the sixth possible implementation manners of the first aspect, in a seventh possible implementation manner, the measurement result reporting instruction message is an RRC user information request message.

With reference to the first aspect or the first to the seventh possible implementation manners of the first aspect, in an eighth possible implementation manner, the reporting, to the serving base station, an RS SNR obtained by means of measurement specifically includes:

reporting, to the serving base station, an RRC user information feedback message carrying the RS SNR obtained by means of measurement.

With reference to the first aspect or the first to the eighth possible implementation manners of the first aspect, in a ninth possible implementation manner, the RS SNR is an RS SNR of a serving cell of the serving base station; or the RS SNR is an RS SNR of a primary serving cell of a serving cell of the serving base station or an RS SNR of a secondary serving cell of a serving cell of the serving base station; or the RS SNR is an RS SNR of an intra-frequency serving cell of a serving cell of the serving base station or an RS SNR of an inter-frequency serving cell of a serving cell of the serving base station.

According to a second aspect, a reference signal signal-to-noise ratio RS SNR receiving method is provided, including:

receiving a user capability message sent by a terminal, where the user capability message carries capability information of measuring, recording, and reporting an RS SNR by the terminal;

sending a measurement result reporting instruction message to the terminal based on the user capability message; and receiving an RS SNR that is obtained by means of measurement and that is reported by the terminal according to the measurement result reporting instruction message.

With reference to the second aspect, in a first possible implementation manner, the RS SNR is a ratio of an average linear power value of reference signals RSs that are sent by a target base station and that are received on resource elements REs carrying the RSs to a sum of an average linear power value of signals that are sent by at least one non-target base station and that are received on orthogonal frequency division multiplexing OFDM symbols carrying the RSs.

With reference to the second aspect or the first possible implementation manner of the second aspect, in a second possible implementation manner, the user capability message is an evolved universal terrestrial wireless network E-UTRAN radio resource control RRC message.

With reference to the second aspect or the first and the second possible implementation manners of the second aspect, in a third possible implementation manner, before the receiving an RS SNR that is obtained at least by means of measurement and that is reported by the terminal, the method further includes:

sending a measurement instruction message to the terminal, to instruct the terminal to measure an RS SNR of a transmission link between the terminal and the target base station according to the measurement instruction message, where the measurement instruction message carries at least information instructing the terminal to measure the RS SNR of the transmission link between the terminal and the target base station.

With reference to the third possible implementation manner of the second aspect, in a fourth possible implementation manner, after the sending a measurement instruction message to the terminal, the method further includes:

receiving a measurement complete indication message sent by the terminal, where the measurement complete indication message carries at least information indicating that measurement of the RS SNR of the transmission link between the terminal and the target base station is completed.

With reference to the third or the fourth possible implementation manner of the second aspect, in a fifth possible implementation manner, the measurement instruction message is a logged measurement configuration message, and the measurement complete indication message is an RRC connection reconfiguration complete message.

With reference to the second aspect or the first to the fourth possible implementation manners of the second aspect, in a sixth possible implementation manner, the measurement result reporting instruction message carries at least information about the RS SNR reported by the terminal, where the information about the RS SNR reported by the terminal is included in information about all measurement values reported by the terminal, and all the measurement values include at least a measurement value of the RS SNR; or the information about the RS SNR reported by the terminal is included in information about a specified measurement value reported by the terminal, and the specified measurement value includes at least a measurement value of the RS SNR.

With reference to the second aspect or the first to the sixth possible implementation manners of the second aspect, in a seventh possible implementation manner, the measurement result reporting instruction message is an RRC message user information request message.

With reference to the second aspect or the first to the seventh possible implementation manners of the second aspect, in an eighth possible implementation manner, the receiving an RS SNR that is obtained at least by means of measurement and that is reported by the terminal specifically includes:

receiving an RRC user information feedback message that is reported by the terminal and that carries at least the RS SNR obtained by means of measurement.

With reference to the second aspect or the first to the eighth possible implementation manners of the second aspect, in a ninth possible implementation manner, the RS SNR is an RS SNR of a serving cell of the serving base station; or the RS SNR is an RS SNR of a primary serving cell of a serving cell of the serving base station or an RS SNR of a secondary serving cell of a serving cell of the serving base station; or the RS SNR is an RS SNR of an intra-frequency serving cell of a serving cell of the serving base station or an RS SNR of an inter-frequency serving cell of a serving cell of the serving base station.

According to a third aspect, a reference signal signal-to-noise ratio RS SNR reporting apparatus is provided, including:

a sending unit, configured to send a user capability message to a serving base station, where the user capability message carries capability information of measuring, recording, and reporting an RS SNR by a terminal;

a receiving unit, configured to receive a measurement result reporting instruction message sent by the serving base station based on the user capability message; and a reporting unit, configured to report, to the serving base station, an RS SNR obtained by means of measurement.

With reference to the third aspect, in a first possible implementation manner, the RS SNR reported by the reporting unit is a ratio of an average linear power value of reference signals RSs that are sent by a target base station and that are received on resource elements REs carrying the RSs to a sum of an average linear power value of signals that are sent by at least one non-target base station and that are received on orthogonal frequency division multiplexing OFDM symbols carrying the RSs.

With reference to the third aspect or the first possible implementation manner of the third aspect, in a second possible implementation manner, the user capability message sent by the sending unit is an evolved universal terrestrial wireless network E-UTRAN radio resource control RRC message.

With reference to the third aspect or the first and the second possible implementation manners of the third aspect, in a third possible implementation manner, the apparatus further includes: a measurement unit, where the measurement unit is configured to obtain the RS SNR by means of measurement in the following manner:

receiving a measurement instruction message sent by the serving base station, where the measurement instruction message carries information instructing the terminal to measure an RS SNR of a transmission link between the terminal and the target base station; and measuring the RS SNR of the transmission link between the terminal and the target base station according to the measurement instruction message.

With reference to the third possible implementation manner of the third aspect, in a fourth possible implementation manner, the measurement unit is further configured to:

send a measurement complete indication message to the serving base station, where the measurement complete indication message carries information indicating that measurement of the RS SNR of the transmission link between the terminal and the target base station is completed.

With reference to the third or the fourth possible implementation manner of the third aspect, in a fifth possible implementation manner, the measurement instruction message received by the measurement unit is a logged measurement configuration message, and the measurement complete indication message sent by the measurement unit is an RRC connection reconfiguration complete message.

With reference to the third aspect or the first to the fourth possible implementation manners of the third aspect, in a sixth possible implementation manner, the measurement result reporting instruction message received by the receiving unit carries information about the RS SNR reported by the terminal, where the information about the RS SNR reported by the terminal is included in information about all measurement values reported by the terminal, and all the measurement values include at least a measurement value of the RS SNR; or the information about the RS SNR reported by the terminal is included in information about a specified measurement value reported by the terminal, and the specified measurement value includes at least a measurement value of the RS SNR.

With reference to the third aspect or the first to the sixth possible implementation manners of the third aspect, in a seventh possible implementation manner, the measurement result reporting instruction message received by the receiving unit is an RRC user information request message.

With reference to the third aspect or the first to the seventh possible implementation manners of the third aspect, in an eighth possible implementation manner, the reporting unit is specifically configured to:

report, to the serving base station, an RRC user information feedback message carrying the RS SNR obtained by means of measurement.

With reference to the third aspect or the first to the eighth possible implementation manners of the third aspect, in a ninth possible implementation manner, the RS SNR reported by the reporting unit is an RS SNR of a serving cell of the serving base station; or the RS SNR is an RS SNR of a primary serving cell of a serving cell of the serving base station or an RS SNR of a secondary serving cell of a serving cell of the serving base station; or the RS SNR is an RS SNR of an intra-frequency serving cell of a serving cell of the serving base station or an RS SNR of an inter-frequency serving cell of a serving cell of the serving base station.

According to a fourth aspect, a reference signal signal-to-noise ratio RS SNR receiving apparatus is provided, including:

a first receiving unit, configured to receive a user capability message sent by a terminal, where the user capability message carries capability information of measuring, recording, and reporting an RS SNR by the terminal;

a sending unit, configured to send a measurement result reporting instruction message to the terminal based on the user capability message; and a second receiving unit, configured to receive an RS SNR that is obtained by means of measurement and that is reported by the terminal according to the measurement result reporting instruction message.

With reference to the forth aspect, in a first possible implementation manner, the RS SNR received by the second receiving unit is a ratio of an average linear power value of reference signals RSs that are sent by a target base station and that are received on resource elements REs carrying the RSs to a sum of an average linear power value of signals that are sent by at least one non-target base station and that are received on orthogonal frequency division multiplexing OFDM symbols carrying the RSs.

With reference to the second aspect or the first possible implementation manner of the second aspect, in a second possible implementation manner, the user capability message received by the first receiving unit is an evolved universal terrestrial wireless network E-UTRAN radio resource control RRC message.

With reference to the second aspect or the first and the second possible implementation manners of the second aspect, in a third possible implementation manner, the sending unit is further configured to:

send a measurement instruction message to the terminal, to instruct the terminal to measure an RS SNR of a transmission link between the terminal and the target base station according to the measurement instruction message, where the measurement instruction message carries at least information instructing the terminal to measure the RS SNR of the transmission link between the terminal and the target base station.

With reference to the third possible implementation manner of the second aspect, in a fourth possible implementation manner, the second receiving unit is further configured to:

receive a measurement complete indication message sent by the terminal, where the measurement complete indication message carries at least information indicating that measurement of the RS SNR of the transmission link between the terminal and the target base station is completed.

With reference to the third or the fourth possible implementation manner of the second aspect, in a fifth possible implementation manner, the measurement instruction message sent by the sending unit is a logged measurement configuration message, and the measurement complete indication message received by the second receiving unit is an RRC connection reconfiguration complete message.

With reference to the second aspect or the first to the fourth possible implementation manners of the second aspect, in a sixth possible implementation manner, the measurement result reporting instruction message sent by the sending unit carries at least information about the RS SNR reported by the terminal, where the information about the RS SNR reported by the terminal is included in information about all measurement values reported by the terminal, and all the measurement values include at least a measurement value of the RS SNR; or the information about the RS SNR reported by the terminal is included in information about a specified measurement value reported by the terminal, and the specified measurement value includes at least a measurement value of the RS SNR.

With reference to the second aspect or the first to the sixth possible implementation manners of the second aspect, in a seventh possible implementation manner, the measurement result reporting instruction message sent by the sending unit is an RRC message user information request message.

With reference to the second aspect or the first to the seventh possible implementation manners of the second aspect, in an eighth possible implementation manner, the second receiving unit is specifically configured to:

receive an RRC user information feedback message that is reported by the terminal and that carries at least the RS SNR obtained by means of measurement.

With reference to the second aspect or the first to the eighth possible implementation manners of the second aspect, in a ninth possible implementation manner, the RS SNR received by the second receiving unit is an RS SNR of a serving cell of the serving base station; or the RS SNR is an RS SNR of a primary serving cell of a serving cell of the serving base station or an RS SNR of a secondary serving cell of a serving cell of the serving base station; or the RS SNR is an RS SNR of an intra-frequency serving cell of a serving cell of the serving base station or an RS SNR of an inter-frequency serving cell of a serving cell of the serving base station.

Beneficial effects of the present invention are as follows:

In the prior art, transmission link quality is determined according to RSRP and RSRQ, so as to optimize a network. However, the RSRP and the RSRQ cannot truly reflect downlink or uplink transmission link quality. Therefore, the transmission link quality determined according to the RSRP and the RSRQ has a large error and low accuracy. In the embodiments of the present invention, a terminal sends a user capability message to a serving base station, where the user capability message carries capability information of measuring and reporting an RS (Reference Signal, reference signal) SNR (Signal to Noise Ratio, signal to noise ratio) by the terminal; the serving base station sends a measurement result reporting instruction message to the terminal based on the user capability message, and then reports, to the serving base station, an RS SNR obtained by means of measurement. In actual application, transmission link quality is reflected in whether a data packet of a user is correctly transmitted, that is, a bit error rate or a packet error rate of data packet transmission, and an SNR may have a direct mapping relationship with the bit error rate or the packet error rate; therefore, in this solution, after the serving base station receives the RS SNR reported by the terminal, accuracy of transmission link quality determined according to the RS SNR is high, so that a network can be effectively optimized.

DESCRIPTION OF EMBODIMENTS

Figure 1:
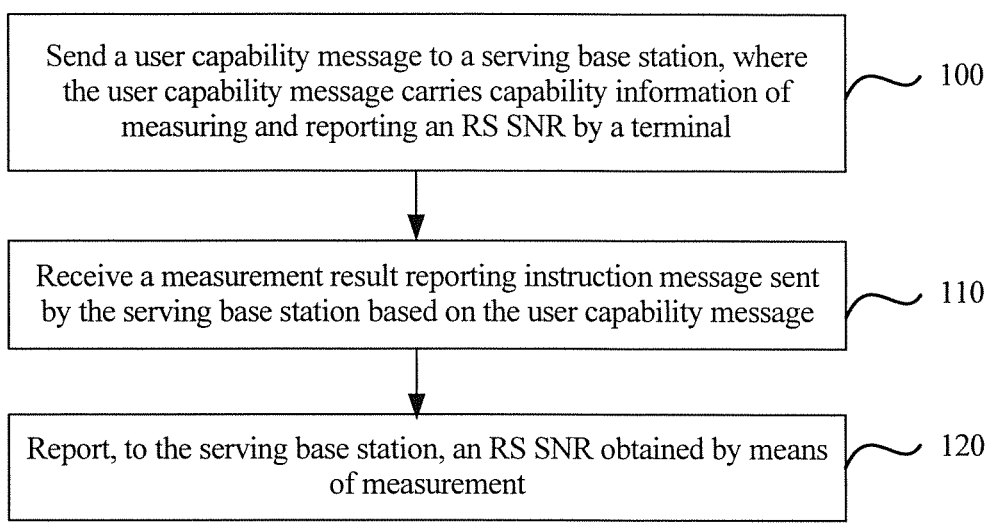
FIG. 1 is a detailed flowchart of reporting an RS SNR according to an embodiment of the present invention.

To resolve a problem in the prior art that determined transmission link quality has a large error and low accuracy, embodiments of the present invention propose an RS SNR reporting method. In this solution, a user capability message is sent to a serving base station, where the user capability message carries capability information of measuring and reporting an RS SNR by a terminal; a measurement result reporting instruction message sent by the serving base station based on the user capability message is received; and an RS SNR obtained by means of measurement is reported to the serving base station. In actual application, transmission link quality is reflected in whether a data packet of a user is correctly transmitted, that is, a bit error rate or a packet error rate of data packet transmission, and an SNR may have a direct mapping relationship with the bit error rate or the packet error rate; therefore, in this solution, after the serving base station receives the RS SNR reported by the terminal, accuracy of transmission link quality determined according to the RS SNR is high, so that a network can be effectively optimized.

An RS SNR receiving method is further proposed. In this solution, a user capability message sent by a terminal is received, where the user capability message carries capability information of measuring and reporting an RS SNR by the terminal; a measurement result reporting instruction message is sent to the terminal based on the user capability message; and an RS SNR that is obtained by means of measurement and that is reported by the terminal according to the measurement result reporting instruction message is received. In actual application, transmission link quality is reflected in whether a data packet of a user is correctly transmitted, that is, a bit error rate or a packet error rate of data packet transmission, and an SNR may have a direct mapping relationship with the bit error rate or the packet error rate; therefore, in this solution, after a serving base station receives the RS SNR reported by the terminal, accuracy of transmission link quality determined according to the RS SNR is high, so that a network can be effectively optimized.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next generation communications system, for example, GSM, a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency-Division Multiple Access (OFDMA) system, a single-carrier FDMA (SC-FDMA) system, a general packet radio service (GPRS) system, and other communications systems.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes exemplary implementation manners of the present invention in detail with reference to accompanying drawings.

Referring to FIG. 1, in an embodiment of the present invention, a detailed procedure of reporting an RS SNR is as follows:

Step 100: Send a user capability message to a serving base station, where the user capability message carries capability information of measuring and reporting an RS SNR by a terminal.

Step 110: Receive a measurement result reporting instruction message sent by the serving base station based on the user capability message.

Step 120: Report, to the serving base station, an RS SNR obtained by means of measurement.

There are multiple manners for calculating the RS SNR. Optionally, in this embodiment of the present invention, the RS SNR is a ratio of an average linear power value of RSs that are sent by a target base station and that are received on Us carrying the RSs to a sum of an average linear power value of signals that are sent by at least one non-target base station and that are received on OFDM symbols carrying the RSs.

Based on the foregoing definition, the RS SNR actually covers two situations: an SNR and an SINR. When the terminal detects no strong interference in a network (that is, I=0), the RS SNR is a signal-to-noise ratio of a reference signal received by the terminal. When the terminal can detect strong interference (that is, I≠0), the RS SNR is a signal to interference plus noise ratio of a reference signal received by the terminal.

Certainly, in actual application, there are multiple manners for calculating the RS SNR. Details are not described herein.

In this embodiment of the present invention, there are multiple types of user capability messages that are sent to the serving base station in step 100. Optionally, the user capability message is an evolved universal terrestrial radio access network (E-UTRAN) message, that is, the terminal feeds back, by using the E-UTRAN message, information indicating that the terminal has a capability of measuring an RS SNR, recording an RS SNR, and reporting an RS SNR.

In an implementation process, information indicating the capability of measuring, recording, and reporting an RS SNR may be added to an E-UTRAN RRC message. The newly added information indicating the capability of measuring, recording, and reporting an RS SNR is a Boolean variable that needs to be only 1 bit. For indicating that the terminal has the capability, the information indicating the capability of measuring, recording, and reporting an RS SNR may be set to True or supported, which is shown as follows:

```
......
......(un-related IEs omitted)
UE-BasedNetwPerfMeasParameters-r10 ::=   SEQUENCE {
    loggedMeasurementsIdle-r10   ENUMERATED        {supported}
OPTIONAL,
    rssnrloggedMeasurementsIdleENUMERATED          {supported}
OPTIONAL,
    standaloneGNSS-Location-r10   ENUMERATED       {supported}
OPTIONAL
    }
......(un-related IEs omitted)
```

The rssnrloggedMeasurementsIdle is only a naming manner of the information indicating the capability of measuring, recording, and reporting an RS SNR, indicates that the terminal has the capability of measuring an RS SNR, recording an RS SNR, and reporting an RS SNR, and needs to be only 1 bit. In actual application, another naming manner may be used. The another naming manner used falls within the protection scope of this solution provided that a same physical meaning is indicated.

The foregoing is only an example in which a user capability message that carries capability information of measuring, recording, and reporting an RS SNR by a terminal is an E-UTRAN RRC message. In actual application, the user capability message that carries the capability information of measuring, recording, and reporting an RS SNR by a terminal may be another message. Details are not described herein.

In this embodiment of the present invention, there are multiple manners for measuring the RS SNR. Optionally, the following manner may be used for measurement:

receiving a measurement instruction message sent by the serving base station, where the measurement instruction message carries information instructing the terminal to measure an RS SNR of a transmission link between the terminal and the target base station; and measuring the RS SNR of the transmission link between the terminal and the target base station according to the measurement instruction message. In actual application, another measurement manner may be used. Details are not described herein.

In this embodiment of the present invention, the measurement instruction message carries the information instructing the terminal to measure the RS SNR of the transmission link between the terminal and the target base station. The information instructing the terminal to measure the RS SNR of the transmission link between the terminal and the target base station indicates that, when the terminal needs to perform data measurement, an RS SNR experienced by the terminal needs to be recorded and reported, and the information instructing the terminal to measure the RS SNR of the transmission link between the terminal and the target base station needs to be only 1 bit. For indicating that the serving base station instructs the terminal to perform the foregoing operation, the information instructing the terminal to measure the RS SNR of the transmission link between the terminal and the target base station may be set to True or supported.

In this embodiment of the present invention, there are multiple types of measurement instruction messages. For example, the measurement instruction message may be a logged measurement configuration message shown as follows:

```
ASN1START
    LoggedMeasurementConfiguration-r10 ::=  SEQUENCE {
    criticalExtensions              CHOICE {
    c1                              CHOICE {
    loggedMeasurementConfiguration-r10
LoggedMeasurementConfiguration-r10-IEs,
        spare3 NULL, spare2 NULL, spare1 NULL
    },
        criticalExtensionsFuture        SEQUENCE { }
    }
    }
    LoggedMeasurementConfiguration-r10-IEs ::= SEQUENCE {
        traceReference-r10              TraceReference-r10,
        traceRecordingSessionRef-r10    OCTET STRING (SIZE (2)),
        tce-Id-r10                      OCTET STRING (SIZE (1)),
        absoluteTimeInfo-r10            AbsoluteTimeInfo-r10,
        areaConfiguration-r10           AreaConfiguration-r10     OPTIONAL, --
Need OR
        loggingDuration-r10             LoggingDuration-r10,
        loggingInterval-r10             LoggingInterval-r10,
        rssnrloggingindication          ENUMERATED {True}    OPTIONAL,
        nonCriticalExtension    LoggedMeasurementConfiguration-v1080-IEs
OPTIONAL -- Need OP
    }
        LoggedMeasurementConfiguration-v1080-IEs ::= SEQUENCE {
        lateNonCriticalExtension-r10    OCTET STRING     OPTIONAL,-- Need
OP
        nonCriticalExtension    LoggedMeasurementConfiguration-v1130-IEs
    OPTIONAL -- Need OP
        }
        LoggedMeasurementConfiguration-v1130-IEs ::= SEQUENCE {
        plmn-IdentityList-r11  PLMN-IdentityList3-r11   OPTIONAL,-- Need OR
        areaConfiguration-v1130   AreaConfiguration-v1130 OPTIONAL,-- Need
OR
        nonCriticalExtension    SEQUENCE { }    OPTIONAL -- Need OP
        }
        -- ASN1STOP
```

The rssnrloggingindication is only a naming manner of the information instructing the terminal to measure the RS SNR of the transmission link between the terminal and the target base station and indicates that, when the terminal performs data measurement, an RS SNR experienced by the terminal needs to be recorded and reported. In actual application, another naming manner may be used. The another naming manner used falls within the protection scope of this solution provided that a same physical meaning is indicated.

In this embodiment of the present invention, after the RS SNR of the transmission link between the terminal and the target base station is measured, a measurement complete indication message is further sent to the serving base station, where the measurement complete indication message carries information indicating that measurement of the RS SNR of the transmission link between the terminal and the target base station is completed. The information carried in the measurement complete indication message indicates that the terminal has already completed a task related to measurement (Logging) of data required by the serving base station.

There are multiple types of measurement complete indication messages. Optionally, the measurement complete indication message is an radio resource control (RRC) connection reconfiguration complete message. In actual application, the measurement complete indication message may be another message. Details are not described herein.

In this embodiment of the present invention, the measurement result reporting instruction message carries information about the RS SNR reported by the terminal, where the information about the RS SNR reported by the terminal is included in information about all measurement values reported by the terminal, and all the measurement values include at least a measurement value of the RS SNR.

For example, the measurement result reporting instruction message carries the information about all the measurement values reported by the terminal, where all the measurement values of the terminal are a measurement value of RSRP, a measurement value of RSRQ, a measurement value of an RS SNR, and a measurement value of an RS SINR. In this case, when the measurement result reporting instruction message carries the information about all the measurement values reported by the terminal, the measurement result reporting instruction message carries the information about the RS SNR reported by the terminal.

In this embodiment of the present invention, the measurement result reporting instruction message carries information about the RS SNR reported by the terminal, where the information about the RS SNR reported by the terminal is included in information about a specified measurement value reported by the terminal, and the specified measurement value includes at least a measurement value of the RS SNR.

For example, the measurement result reporting instruction message carries the information about the specified measurement value reported by the terminal. Although all measurement values of the terminal are a measurement value of RSRP, a measurement value of RSRQ, a measurement value of an RS SNR, and a measurement value of an RS SINR, the specified measurement value reported by the terminal is the measurement value of RSRP and the measurement value of an RS SNR. In this case, when the measurement result reporting instruction message carries the information about the specified measurement value reported by the terminal, the measurement result reporting instruction message carries the information about the RS SNR reported by the terminal.

In this embodiment of the present invention, when an RRC user information request message carries the information about the RS SNR reported by the terminal, a format of the RRC user information request message is as follows:

value, if the measurement value is set to 1, it indicates that the measurement value needs to be reported; if the measurement value is set to 0, it indicates that the measurement value does not need to be reported. In this embodiment, if only the RS SNR needs to the reported, a value of a string of bit flow is "00100000", and when only the RSRP and the RS SNR need to be reported, a value of a string of bit flow is "10100000".

The UEInformationRequest-v12x0 and requestedloggedMeasurements are only a naming manner and indicate a measurement value that needs to be reported. In actual application, another naming manner may be used. The another naming manner used falls within the protection scope of this solution provided that a same physical meaning is indicated.

In this embodiment of the present invention, there are multiple types of measurement result reporting instruction messages. For example, the measurement result reporting instruction message is an RRC user information request message. In actual application, the measurement result reporting instruction message may be another message. Details are not described herein.

```
-- ASN1START
UEInformationRequest-r9      ::=     SEQUENCE {
rrc-TransactionIdentifier      RRC-TransactionIdentifier,
criticalExtensions     CHOICE {
c1      CHOICE {
ueInformationRequest-r9        UEInformationRequest-r9-IEs,
spare3 NULL, spare2 NULL, spare1 NULL
},
criticalExtensionsFuture       SEQUENCE { }
}
}
UEInformationRequest-r9-IEs ::=      SEQUENCE {
    rach-ReportReq-r9         BOOLEAN,
    rlf-ReportReq-r9          BOOLEAN,
    nonCriticalExtension    UEInformationRequest-v930-IEs    OPTIONAL --
Need OP
    }
    UEInformationRequest-v930-IEs ::= SEQUENCE {
    lateNonCriticalExtension   OCTET STRING       OPTIONAL,-- Need OP
    nonCriticalExtension       UEInformationRequest-v1020-IEs
    OPTIONAL              -- Need OP
    }
    UEInformationRequest-v1020-IEs ::=      SEQUENCE {
    logMeasReportReq-r10        ENUMERATED {true}        OPTIONAL,
    -- Need ON
    nonCriticalExtension       UEInformationRequest-v1130-IEs
    OPTIONAL              -- Need OP
    }
    UEInformationRequest-v1130-IEs ::= SEQUENCE {
    connEstFailReportReq-r11      ENUMERATED {true}   OPTIONAL,--
Need ON
    nonCriticalExtension      SEQUENCE { }    OPTIONAL -- Need OP
    }
    UEInformationRequest-v12x0 ::= SEQUENCE {
    requestedloggedMeasurements BIT STRING {     rsrpReq   (0),
                                                 rsrqReq   (1),
                                                 rssnrReq  (2) }
(SIZE(1..8)),
    ...
    }
    -- ASN1STOP
```

The "requestedloggedMeasurements" indicates a measurement value that needs to be reported by the terminal, and is represented as a bit flow. It is assumed that requestedloggedMeasurements has 8 bits. The first bit indicates whether to report a measurement value of RSRP, the second bit indicates whether to report a measurement value of RSRQ, the third bit indicates whether to report a measurement value of an RS SNR, and the other bits indicate other measurement values or reserved bits. For any measurement In this embodiment of the present invention, there are multiple manners for reporting, to the serving base station, the RS SNR obtained by means of measurement. For example, an RRC user information feedback message carrying the RS SNR obtained by means of measurement is reported to the serving base station, where carrying, by the RRC user information feedback message, the RS SNR obtained by means of measurement is shown as follows:

```
......
......(un-related IEs omitted)
LogMeasInfo-r10 ::=     SEQUENCE {
locationInfo-r10     LocationInfo-r10      OPTIONAL,
relativeTimeStamp-r10    INTEGER (0..7200),
servCellIdentity-r10     CellGlobalIdEUTRA,
measResultServCell-r10   SEQUENCE {
rsrpResult-r10   RSRP-Range,
rsrqResult-r10   RSRQ-Range,
rssnrResult      RSSNR-Range     OPTIONAL,
},
   measResultNeighCells-r10     SEQUENCE {
   measResultListEUTRA-r10   MeasResultList2EUTRA-r9
   OPTIONAL,
   measResultListUTRA-r10      MeasResultList2UTRA-r9
   OPTIONAL,
   measResultListGERAN-r10      MeasResultList2GERAN-r10
OPTIONAL,
   measResultListCDMA2000-r10   MeasResultList2CDMA2000-r9
OPTIONAL
   }     OPTIONAL,
   ...,
   [[    measResultListEUTRA-v1090 MeasResultList2EUTRA-v9e0
         OPTIONAL
   ]]
}
......(un-related IEs omitted)
......
RLF-Report-r9 ::=     SEQUENCE {
measResultLastServCell-r9    SEQUENCE {
rsrpResult-r9    RSRP-Range,
rsrqResult-r9 RSRQ-Range       OPTIONAL
rssnrResult   RSSNR-Range      OPTIONAL
},
measResultNeighCells-r9      SEQUENCE {
measResultListEUTRA-r9   MeasResultList2EUTRA-r9
OPTIONAL,
measResultListUTRA-r9    MeasResultList2UTRA-r9
OPTIONAL,
measResultListGERAN-r9   MeasResultListGERAN OPTIONAL,
measResultsCDMA2000-r9      MeasResultList2CDMA2000-r9
OPTIONAL
} OPTIONAL,
...,
[[    locationInfo-r10    LocationInfo-r10     OPTIONAL,
failedPCellId-r10 CHOICE {
cellGlobalId-r10    CellGlobalIdEUTRA,
pci-arfcn-r10 SEQUENCE {
physCellId-r10     PhysCellId,
carrierFreq-r10     ARFCN-ValueEUTRA
}
}    OPTIONAL,
reestablishmentCellId-r10   CellGlobalIdEUTRA    OPTIONAL,
timeConnFailure-r10    INTEGER (0..1023)    OPTIONAL,
connectionFailureType-r10   ENUMERATED {rlf, hof}    OPTIONAL,
previousPCellId-r10     CellGlobalIdEUTRA       OPTIONAL
]],
[[    failedPCellId-v1090    SEQUENCE {
carrierFreq-v1090    ARFCN-ValueEUTRA-v9e0
}    OPTIONAL
]],
[[    basicFields-r11     SEQUENCE {
c-RNTI-r11   C-RNTI,
rlf-Cause-r11 ENUMERATED {
t310-Expiry, randomAccessProblem,
rlc-MaxNumRetx, spare1},
timeSinceFailure-r11   TimeSinceFailure-r11
} OPTIONAL,
previousUTRA-CellId-r11 SEQUENCE {
carrierFreq-r11    ARFCN-ValueUTRA,
physCellId-r11     CHOICE {
fdd-r11   PhysCellIdUTRA-FDD,
tdd-r11   PhysCellIdUTRA-TDD
},
cellGlobalId-r11   CellGlobalIdUTRA OPTIONAL
} OPTIONAL,
selectedUTRA-CellId-r11    SEQUENCE {
carrierFreq-r11    ARFCN-ValueUTRA,
physCellId-r11     CHOICE {
fdd-r11   PhysCellIdUTRA-FDD,
tdd-r11   PhysCellIdUTRA-TDD
```

-continued

```
}
}     OPTIONAL
]]
}
```

A format of RSSNR-Range newly added in the foregoing embodiment is as follows:

```
-- ASN1START
RSSNR-Range ::=   INTEGER(0..X)
-- ASN1STOP
```

In this embodiment of the present invention, the RSSNR-Range is only a naming manner and indicates a value range of the RS SNR reported by the terminal. Optionally, X=34. In actual application, another naming manner may be used for the value range of the RS SNR reported by the terminal. The another naming manner used falls within the protection scope of this solution provided that a same physical meaning is indicated.

In actual application, the RS SNR obtained by means of measurement may be reported to the serving base station in another implementation manner. Details are not described herein.

In this embodiment of the present invention, the RS SNR may be an RS SNR of a serving cell of the serving base station, which may be represented as: SNR_serving or SINR_serving. When the terminal supports carrier aggregation, the RS SNR may be an RS SNR of a primary serving cell of a serving cell of the serving base station or an RS SNR of a secondary serving cell of a serving cell of the serving base station, which may be represented as: SNR_pcell or SINR_pcell, or SNR_scell or SINR_scell, or the RS SNR may be an RS SNR of an intra-frequency serving cell of a serving cell of the serving base station or an RS SNR of an inter-frequency serving cell of a serving cell of the serving base station, which may be represented as: SNR_neighbour or SINR_neighbour.

For better understanding of this embodiment of the present invention, a specific application scenario is provided in the following. A process of reporting an RS SNR is further described in detail.

Figure 2:
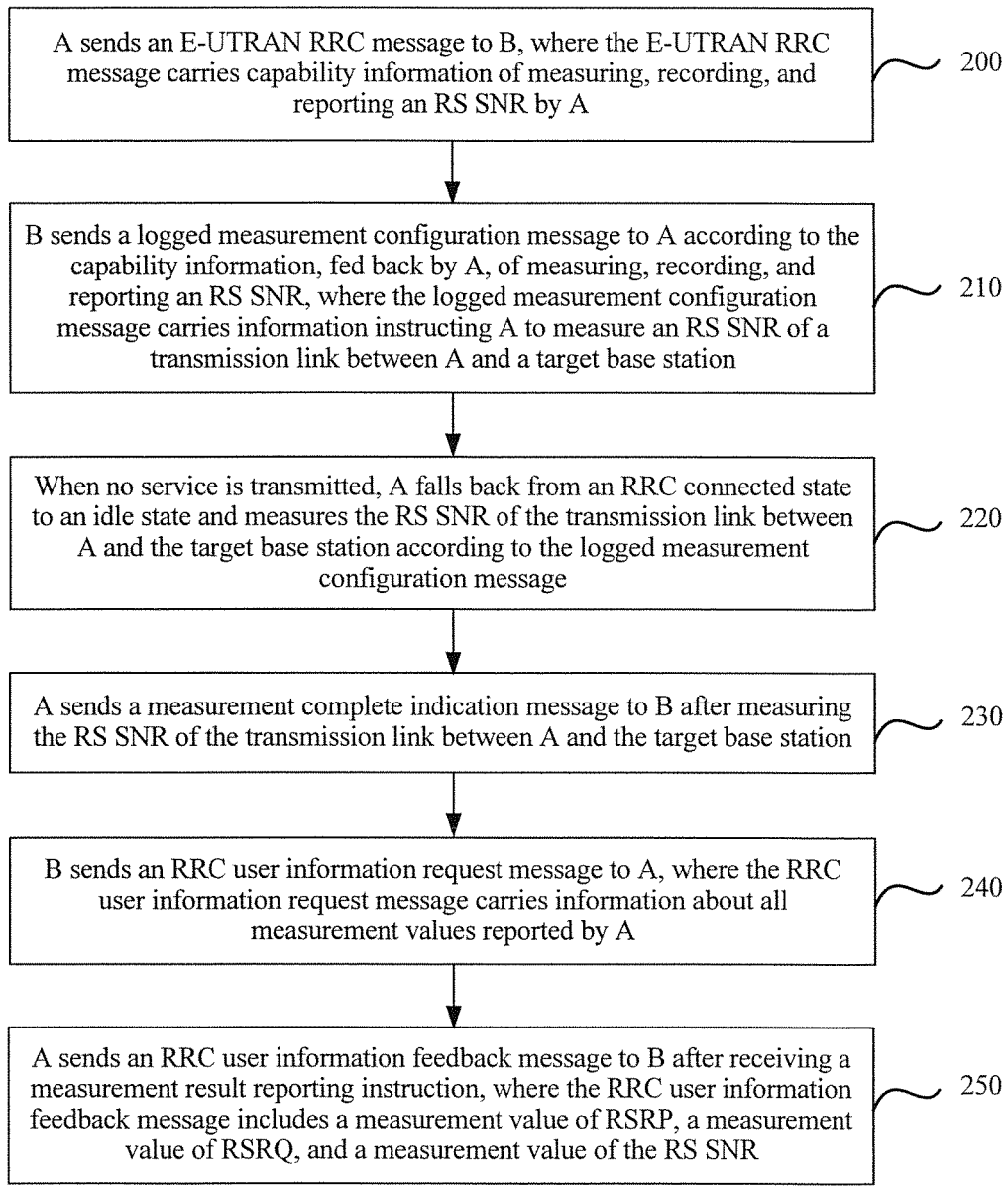
FIG. 2 is a first embodiment of reporting an RS SNR according to an embodiment of the present invention.

Embodiment 1 is specifically shown in FIG. 2 (a terminal is A, and a serving base station is B).

Step 200: A sends an E-UTRAN RRC message to B, where the E-UTRAN RRC message carries capability information of measuring, recording, and reporting an RS SNR by A.

In this step, A feeds back, to B by using the E-UTRAN RRC message, information indicating that A has a capability of measuring, recording, and reporting an RS SNR.

Step 210: B sends a logged measurement configuration message to A according to the capability information, fed back by A, of measuring, recording, and reporting an RS SNR, where the logged measurement configuration message carries information instructing A to measure an RS SNR of a transmission link between A and a target base station.

In this step, A adds, to the logged measurement configuration message according to an minimization of drive tests (MDT) requirement on a network side, the information instructing A to measure the RS SNR of the transmission link between A and the target base station.

Step 220: When no service is transmitted, A falls back from an RRC connected state to an idle state and measures the RS SNR of the transmission link between A and the target base station according to the logged measurement configuration message.

In this step, A measures and records the RS SNR according to parameters such as a logging interval (LoggingInterval) and logging duration (LoggingDuration).

Step 230: A sends a measurement complete indication message to B after measuring the RS SNR of the transmission link between A and the target base station.

In this step, when completing measurement, A changes from the idle state into a connected state, and the measurement complete indication message carries information indicating that measurement of the RS SNR of the transmission link between A and the target base station is completed.

Step 240: B sends an RRC user information request message to A, where the RRC user information request message carries information about all measurement values reported by A.

In this step, all the measurement values include a measurement value of RSRP, a measurement value of RSRQ, and a measurement value of an RS SNR.

Step 250: A sends an RRC user information feedback message to B after receiving a measurement result reporting instruction, where the RRC user information feedback message includes a measurement value of RSRP, a measurement value of RSRQ, and a measurement value of the RS SNR.

After step 250, B may optimize a network according to a measurement value of the RS SNR reported by A.

Figure 3:
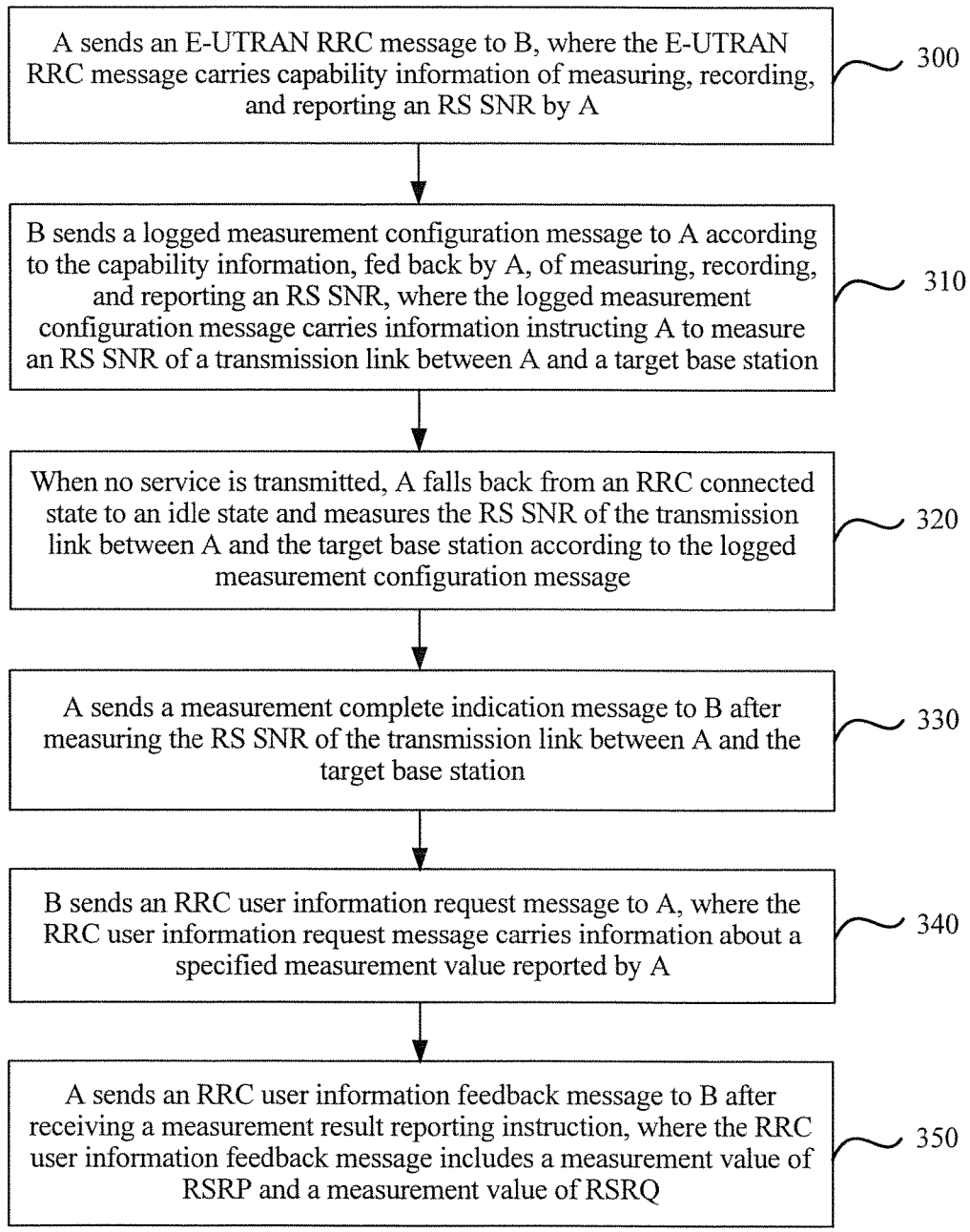
FIG. 3 is a second embodiment of reporting an RS SNR according to an embodiment of the present invention.

Embodiment 2 is specifically shown in FIG. 3 (a terminal is A, and a serving base station is B).

Step 300: A sends an E-UTRAN RRC message to B, where the E-UTRAN RRC message carries capability information of measuring, recording, and reporting an RS SNR by A.

In this step, A feeds back, to B by using the E-UTRAN RRC message, information indicating that A has a capability of measuring, recording, and reporting an RS SNR.

Step 310: B sends a logged measurement configuration message to A according to the capability information, fed back by A, of measuring, recording, and reporting an RS SNR, where the logged measurement configuration message carries information instructing A to measure an RS SNR of a transmission link between A and a target base station.

In this step, A adds, to the logged measurement configuration message according to an minimization of drive tests (MDT) requirement on a network side, the information instructing A to measure the RS SNR of the transmission link between A and the target base station.

Step 320: When no service is transmitted, A falls back from an RRC connected state to an idle state and measures the RS SNR of the transmission link between A and the target base station according to the logged measurement configuration message.

In this step, A performs measurement and recording according to parameters such as a logging interval (LoggingInterval) and logging duration (LoggingDuration).

Step 330: A sends a measurement complete indication message to B after measuring the RS SNR of the transmission link between A and the target base station.

In this step, when completing measurement, A changes from the idle state into a connected state, and the measurement complete indication message carries information indicating that measurement of the RS SNR of the transmission link between A and the target base station is completed.

Step 340: B sends an RRC user information request message to A, where the RRC user information request message carries information about a specified measurement value reported by A.

In this step, the specified measurement value includes a measurement value of RSRP and a measurement value of an RS SNR.

Step 350: A sends an RRC user information feedback message to B after receiving a measurement result reporting instruction, where the RRC user information feedback message includes a measurement value of RSRP and a measurement value of an RS SNR.

After step 350, B may optimize a network according to a measurement value of the RS SNR reported by A.

In the foregoing process, a serving base station adds, to a measurement instruction message, information about a value that needs to be measured by a terminal, and does not add information about a measurement value that needs to be reported by the terminal, but adds, to a measurement result reporting instruction message, the information about the measurement value that needs to be reported by the terminal. In actual application, the serving base station may further add, to the measurement instruction message, not only the information about the value that needs to be measured by the terminal, but also the information about the measurement value that needs to be reported by the terminal, to notify the terminal of the measurement value that needs to be reported. When receiving a measurement result reporting instruction message sent by the serving base station, the terminal reports the measurement value that is indicated by the serving base station and that needs to be reported.

In this embodiment of the present invention, a serving base station may further add, to a measurement instruction message, not only information about a value that needs to be measured by a terminal, but also information about a measurement value that needs to be reported by the terminal, where the added information about the measurement value that needs to be reported by the terminal may be all measurement values measured by the terminal, or may be a specified measurement value measured by the terminal.

Figure 4:
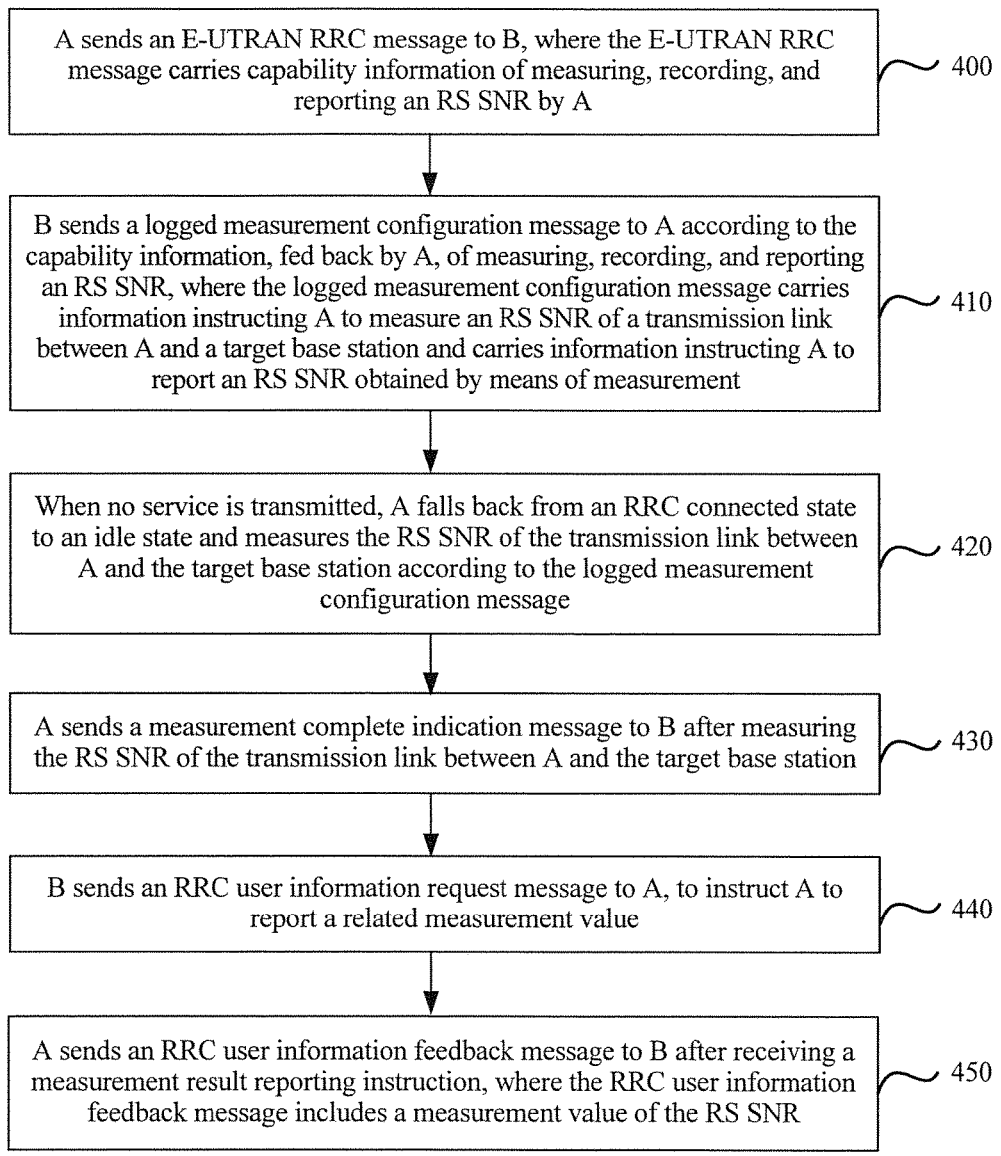
FIG. 4 is a third embodiment of reporting an RS SNR according to an embodiment of the present invention.

Embodiment 3 is specifically shown in FIG. 4 (a terminal is A, and a serving base station is B).

Step 400: A sends an E-UTRAN RRC message to B, where the E-UTRAN RRC message carries capability information of measuring, recording, and reporting an RS SNR by A.

In this step, A feeds back, to B by using the E-UTRAN RRC message, information indicating that A has a capability of measuring, recording, and reporting an RS SNR.

Step 410: B sends a logged measurement configuration message to A according to the capability information, fed back by A, of measuring, recording, and reporting an RS SNR, where the logged measurement configuration message carries information instructing A to measure an RS SNR of a transmission link between A and a target base station and carries information instructing A to report an RS SNR obtained by means of measurement.

In this step, A adds, to the logged measurement configuration message according to an MDT (Minimization of drive-tests, minimization of drive tests) requirement on a network side, the information instructing A to measure the RS SNR of the transmission link between A and the target base station.

Step 420: When no service is transmitted, A falls back from an RRC connected state to an idle state and measures the RS SNR of the transmission link between A and the target base station according to the logged measurement configuration message.

In this step, A performs measurement and recording according to parameters such as a logging interval (LoggingInterval) and logging duration (LoggingDuration).

Step 430: A sends a measurement complete indication message to B after measuring the RS SNR of the transmission link between A and the target base station.

In this step, when completing measurement, A changes from the idle state into a connected state, and the measurement complete indication message carries information indicating that measurement of the RS SNR of the transmission link between A and the target base station is completed.

Step 440: B sends an RRC user information request message to A, to instruct A to report a related measurement value.

Step 450: A sends an RRC user information feedback message to B after receiving a measurement result reporting instruction, where the RRC user information feedback message includes a measurement value of the RS SNR.

After step 450, B may optimize a network according to a measurement value of the RS SNR reported by A.

In examples of the foregoing several embodiments, a terminal performs measurement in an idle state. In actual application, the terminal may also perform measurement and recording in a connected state, that is, the terminal may measure and report an RS SNR regardless of whether the terminal is in an idle state or a connected state. A format of an E-UTRAN RRC message is shown as follows:

```
... ...(un-related IEs omitted)
    UE-BasedNetwPerfMeasParameters-r10 ::= SEQUENCE {
    loggedMeasurementsIdle-r10    ENUMERATED    {supported}
OPTIONAL,
    standaloneGNSS-Location-r10  ENUMERATED    {supported}
OPTIONAL
    }
    rssnrMeasurement-r12   ::= SEQUENCE {
    rssnrMeasurement-r12 ENUMERATED {supported} OPTIONAL,
    ......(un-related IEs omitted)
```

If the E-UTRAN RRC message shown above is used, the terminal may feed back, to the serving base station and regardless of whether the terminal is in an idle state or a connected state, information indicating that the terminal has a capability of measuring, recording, and reporting an RS SNR, and supports RS SNR measurement and reporting regardless of whether the terminal is in an idle state or a connected state.

Figure 5:
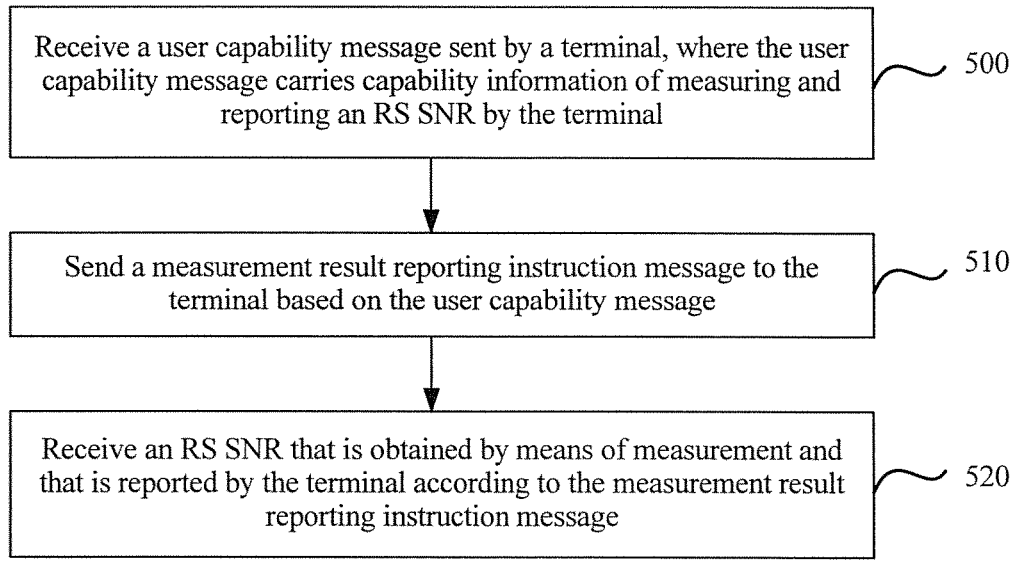
FIG. 5 is a detailed flowchart of receiving an RS SNR according to an embodiment of the present invention.

Referring to FIG. 5, in an embodiment of the present invention, a detailed procedure of receiving an RS SNR is as follows:

Step 500: Receive a user capability message sent by a terminal, where the user capability message carries capability information of measuring and reporting an RS SNR by the terminal.

Step 510: Send a measurement result reporting instruction message to the terminal based on the user capability message.

Step 520: Receive an RS SNR that is obtained by means of measurement and that is reported by the terminal according to the measurement result reporting instruction message.

There are multiple manners for calculating the RS SNR. Optionally, in this embodiment of the present invention, the RS SNR is a ratio of an average linear power value of RSs that are sent by a target base station and that are received on REs carrying the RSs to a sum of an average linear power value of signals that are sent by at least one non-target base station and that are received on OFDM symbols carrying the RSs.

Based on the foregoing definition, the RS SNR actually covers two situations: an SNR and an SINR. When the terminal detects no strong interference in a network (that is, I=0), the RS SNR is a signal-to-noise ratio of a reference signal received by the terminal. When the terminal can detect strong interference (that is, I≠0), the RS SNR is a signal to interference plus noise ratio of a reference signal received by the terminal.

Certainly, in actual application, there are multiple manners for calculating the RS SNR. Details are not described herein.

In this embodiment of the present invention, there are multiple types of user capability messages sent by the terminal in step 500. Optionally, the user capability message is an E-UTRAN RRC message, that is, the terminal feeds back, to a serving base station by using the E-UTRAN message, information indicating that the terminal has a capability of measuring an RS SNR, recording an RS SNR, and reporting an RS SNR.

In an implementation process, information indicating the capability of measuring, recording, and reporting an RS SNR may be added to the E-UTRAN RRC message. The newly added information indicating the capability of measuring, recording, and reporting an RS SNR is a Boolean variable that needs to be only 1 bit. For indicating that the terminal has the capability, the information indicating the capability of measuring, recording, and reporting an RS SNR may be set to True or supported, which is shown as follows:

```
    ......
    ......(un-reated IEs omitted)
    UE-BasedNetwPerfMeasParameters-r10 ::=  SEQUENCE {
    loggedMeasurementsIdle-r10     ENUMERATED    {supported}
OPTIONAL,
    rssnrloggedMeasurementsIdleENUMERATED         {supported}
OPTIONAL,
    standaloneGNSS-Location-r10   ENUMERATED    {supported}
OPTIONAL
    }
    ......(un-related IEs omitted)
```

The rssnrloggedMeasurementsIdle is only a naming manner of the information indicating the capability of measuring, recording, and reporting an RS SNR, indicates that the terminal has the capability of measuring an RS SNR, recording an RS SNR, and reporting an RS SNR, and needs to be only 1 bit. In actual application, another naming manner may be used. The another naming manner used falls within the protection scope of this solution provided that a same physical meaning is indicated.

The foregoing is only an example in which a user capability message that carries capability information of measuring, recording, and reporting an RS SNR by a terminal is an E-UTRAN RRC message. In actual application, the user capability message that carries the capability information of measuring, recording, and reporting an RS SNR by a terminal may be another message. Details are not described herein.

In this embodiment of the present invention, before the receiving an RS SNR that is obtained at least by means of measurement and that is reported by the terminal, the method further includes: sending a measurement instruction message to the terminal, to instruct the terminal to measure an RS SNR of a transmission link between the terminal and the target base station according to the measurement instruction message, where the measurement instruction message carries at least information instructing the terminal to measure the RS SNR of the transmission link between the terminal and the target base station.

In this embodiment of the present invention, the measurement instruction message carries the information instructing the terminal to measure the RS SNR of the transmission link between the terminal and the target base station. The information instructing the terminal to measure the RS SNR of the transmission link between the terminal and the target base station indicates that, when the terminal needs to perform data recording, an RS SNR experienced by the terminal needs to be recorded and reported, and the information instructing the terminal to measure the RS SNR of the transmission link between the terminal and the target base station needs to be only 1 bit. For indicating that the serving base station instructs the terminal to perform the foregoing operation, the information instructing the terminal to measure the RS SNR of the transmission link between the terminal and the target base station may be set to True or supported.

In this embodiment of the present invention, there are multiple types of measurement instruction messages. For example, the measurement instruction message may be a logged measurement configuration message shown as follows:

```
ASN1START
LoggedMeasurementConfiguration-r10 ::= SEQUENCE {
criticalExtensions CHOICE {
c1   CHOICE {
loggedMeasurementConfiguration-r10
LoggedMeasurementConfiguration-r10-IEs,
   spare3 NULL, spare2 NULL, spare1 NULL
   },
   criticalExtensionsFuture   SEQUENCE { }
   }
 }
   LoggedMeasurementConfiguration-r10-IEs ::= SEQUENCE {
   traceReference-r10   TraceReference-r10,
   traceRecordingSessionRef-r10   OCTET STRING (SIZE (2)),
   tce-Id-r10      OCTET STRING (SIZE (1)),
   absoluteTimeInfo-r10   AbsoluteTimeInfo-r10,
   areaConfiguration-r10 AreaConfiguration-r10
   OPTIONAL,-- Need OR
   loggingDuration-r10    LoggingDuration-r10,
   loggingInterval-r10     LoggingInterval-r10,
   rssnrloggingindication   ENUMERATED {True}   OPTIONAL,
   nonCriticalExtension   LoggedMeasurementConfiguration-v1080-IEs
OPTIONAL -- Need OP
 }
   LoggedMeasurementConfiguration-v1080-IEs ::= SEQUENCE {
   lateNonCriticalExtension-r10   OCTET STRING
   OPTIONAL,-- Need OP
   nonCriticalExtension   LoggedMeasurementConfiguration-v1130-IEs
OPTIONAL -- Need OP
   }
   LoggedMeasurementConfiguration-v1130-IEs ::= SEQUENCE {
   plmn-IdentityList-r11   PLMN-IdentityList3-r11
   OPTIONAL,-- Need OR
   areaConfiguration-v1130      AreaConfiguration-v1130
OPTIONAL,-- Need OR
   nonCriticalExtension   SEQUENCE { }
   OPTIONAL -- Need OP
   }
   -- ASN1STOP
```

The rssnrloggingindication is only a naming manner of the information instructing the terminal to measure the RS SNR of the transmission link between the terminal and the target base station and indicates that, when the terminal performs data recording, an RS SNR experienced by the terminal needs to be recorded and reported. In actual application, another naming manner may be used. The another naming manner used falls within the protection scope of this solution provided that a same physical meaning is indicated.

In this embodiment of the present invention, after the measurement instruction message is sent to the terminal, a measurement complete indication message sent by the terminal is further received, where the measurement complete indication message carries at least information indicating that measurement of the RS SNR of the transmission link between the terminal and the target base station is completed. The information carried in the measurement complete indication message indicates that the terminal UE has already completed a task related to measurement (Logging) of data required by the serving base station.

There are multiple types of measurement complete indication messages. Optionally, the measurement complete indication message is an RRC connection reconfiguration complete message. In actual application, the measurement complete indication message may be another message. Details are not described herein.

In this embodiment of the present invention, the measurement result reporting instruction message carries information about the RS SNR reported by the terminal, where the information about the RS SNR reported by the terminal is included in information about all measurement values reported by the terminal, and all the measurement values include at least a measurement value of the RS SNR.

For example, the measurement result reporting instruction message carries the information about all the measurement values reported by the terminal, where all the measurement values of the terminal are a measurement value of RSRP, a measurement value of RSRQ, a measurement value of an RS SNR, and a measurement value of an RS SINR. In this case, when the measurement result reporting instruction message carries the information about all the measurement values reported by the terminal, the measurement result reporting instruction message carries the information about the RS SNR reported by the terminal.

In this embodiment of the present invention, the measurement result reporting instruction message carries information about the RS SNR reported by the terminal, where the information about the RS SNR reported by the terminal is included in information about a specified measurement value reported by the terminal, and the specified measurement value includes at least a measurement value of the RS SNR.

For example, the measurement result reporting instruction message carries the information about the specified measurement value reported by the terminal. Although all measurement values of the terminal are a measurement value of RSRP, a measurement value of RSRQ, a measurement value of an RS SNR, and a measurement value of an RS SINR, the specified measurement value reported by the terminal is the measurement value of RSRP and the measurement value of an RS SNR. In this case, when the measurement result reporting instruction message carries the information about the specified measurement value reported by the terminal, the measurement result reporting instruction message carries the information about the RS SNR reported by the terminal.

In this embodiment of the present invention, when an RRC user information request message carries the information about the RS SNR reported by the terminal, a format of the RRC user information request message is as follows:

```
-- ASN1START
UEInformationRequest-r9 ::= SEQUENCE {
    rrc-TransactionIdentifier   RRC-TransactionIdentifier,
    criticalExtensions   CHOICE {
        c1   CHOICE {
            ueInformationRequest-r9   UEInformationRequest-r9-IEs,
            spare3 NULL, spare2 NULL, spare1 NULL
        },
        criticalExtensionsFuture   SEQUENCE { }
    }
}
UEInformationRequest-r9-IEs ::=   SEQUENCE {
    rach-ReportReq-r9     BOOLEAN,
    rlf-ReportReq-r9      BOOLEAN,
    nonCriticalExtension  UEInformationRequest-v930-IEs   OPTIONAL -- Need OP
}
UEInformationRequest-v930-IEs ::= SEQUENCE {
    lateNonCriticalExtension  OCTET STRING     OPTIONAL,-- Need OP
    nonCriticalExtension   UEInformationRequest-v1020-IEs
    OPTIONAL          -- Need OP
}
UEInformationRequest-v1020-IEs ::=    SEQUENCE {
    logMeasReportReq-r10    ENUMERATED {true}   OPTIONAL, -- Need ON
    nonCriticalExtension    UEInformationRequest-v1130-IEs
    OPTIONAL          -- Need OP
}
UEInformationRequest-v1130-IEs ::= SEQUENCE {
    connEstFailReportReq-r11  ENUMERATED {true}    OPTIONAL,
    -- Need ON
    nonCriticalExtension   SEQUENCE { }  OPTIONAL -- Need OP
}
UEInformationRequest-v12x0 ::= SEQUENCE {
    requestedloggedMeasurements  BIT STRING { rsrpReq  (0),
                                              rsrqReq  (1),
                                              rssnrReq (2)  }
(SIZE(1..8)),
    ...
}
-- ASN1STOP
```

The "requestedloggedMeasurements" indicates a measurement value that needs to be reported by the terminal, and is represented as a bit flow. It is assumed that requestedloggedMeasurements has 8 bits. The first bit indicates whether to report a measurement value of RSRP, the second bit indicates whether to report a measurement value of RSRQ, the third bit indicates whether to report a measurement value of an RS SNR, and the other bits indicate other measurement values or reserved bits. For any measurement value, if the measurement value is set to 1, it indicates that the measurement value needs to be reported; if the measurement value is set to 0, it indicates that the measurement value does not need to be reported. In this embodiment, if only the RS SNR needs to the reported, a value of a string of bit flow is "00100000", and when only the RSRP and the RS SNR need to be reported, a value of a string of bit flow is "10100000".

The UEInformationRequest-v12x0 and requestedloggedMeasurements are only a naming manner and indicate a measurement value that needs to be reported. In actual application, another naming manner may be used. The another naming manner used falls within the protection scope of this solution provided that a same physical meaning is indicated.

In this embodiment of the present invention, there are multiple types of measurement result reporting instruction messages. For example, the measurement result reporting instruction message is an RRC user information request message. In actual application, the measurement result reporting instruction message may be another message. Details are not described herein.

In this embodiment of the present invention, there are multiple manners for receiving the RS SNR that is obtained at least by means of measurement and that is reported by the terminal. For example, an RRC message user information feedback message that is reported by the terminal and that carries at least the RS SNR obtained by means of measurement is received, where carrying, by the RRC user information feedback message, the RS SNR obtained by means of measurement is shown as follows:

```
......
......(un-related IEs omitted)
LogMeasInfo-r10 ::=    SEQUENCE {
    locationInfo-r10        LocationInfo-r10    OPTIONAL,
    relativeTimeStamp-r10   INTEGER (0..7200),
    servCellIdentity-r10    CellGlobalIdEUTRA,
    measResultServCell-r10  SEQUENCE {
        rsrpResult-r10          RSRP-Range,
        rsrqResult-r10   RSRQ-Range,
        rssnrResult      RSSNR-Range      OPTIONAL,
    },
    measResultNeighCells-r10    SEQUENCE {
    measResultListEUTRA-r10  MeasResultList2EUTRA-r9
OPTIONAL,
    measResultListUTRA-r10  MeasResultList2UTRA-r9
OPTIONAL,
    measResultListGERAN-r10   MeasResultList2GERAN-r10
OPTIONAL,
    measResultListCDMA2000-r10   MeasResultList2CDMA2000-r9
OPTIONAL
    } OPTIONAL,
    ...,
    [[  measResultListEUTRA-v1090   MeasResultList2EUTRA-v9e0
```

-continued

```
    OPTIONAL
]]
}
......(un-related IEs omitted)
......
RLF-Report-r9 ::=      SEQUENCE {
measResultLastServCell-r9    SEQUENCE {
rsrpResult-r9      RSRP-Range,
rsrqResult-r9      RSRQ-Range         OPTIONAL
rssnrResult        RSSNR-Range        OPTIONAL
},
measResultNeighCells-r9    SEQUENCE {
measResultListEUTRA-r9    MeasResultList2EUTRA-r9
OPTIONAL,
measResultListUTRA-r9     MeasResultList2UTRA-r9
OPTIONAL,
measResultListGERAN-r9  MeasResultListGERAN   OPTIONAL,
measResultsCDMA2000-r9 MeasResultList2CDMA2000-r9
OPTIONAL
} OPTIONAL,
...,
[[   locationInfo-r10    LocationInfo-r10  OPTIONAL,
failedPCellId-r10  CHOICE {
cellGlobalId-r10      CellGlobalIdEUTRA,
pci-arfcn-r10         SEQUENCE {
physCellId-r10        PhysCellId,
carrierFreq-r10       ARFCN-ValueEUTRA
}
} OPTIONAL,
reestablishmentCellId-r10  CellGlobalIdEUTRA    OPTIONAL,
timeConnFailure-r10     INTEGER (0..1023)    OPTIONAL,
connectionFailureType-r10   ENUMERATED {rlf, hof}
OPTIONAL,
previousPCellId-r10   CellGlobalIdEUTRA   OPTIONAL
]],
[[  failedPCellId-v1090   SEQUENCE {
carrierFreq-v1090   ARFCN-ValueEUTRA-v9e0
}  OPTIONAL
]],
[[    basicFields-r11   SEQUENCE {
c-RNTI-r11        C-RNTI,
rlf-Cause-r11         ENUMERATED {
t310-Expiry, randomAccessProblem,
rlc-MaxNumRetx, spare1},
timeSinceFailure-r11  TimeSinceFailure-r11
}  OPTIONAL,
previousUTRA-CellId-r11 SEQUENCE {
carrierFreq-r11    ARFCN-ValueUTRA,
physCellId-r11    CHOICE {
fdd-r11   PhysCellIdUTRA-FDD,
tdd-r11   PhysCellIdUTRA-TDD
},
cellGlobalId-r11    CellGlobalIdUTRA  OPTIONAL
}  OPTIONAL,
selectedUTRA-CellId-r11      SEQUENCE {
carrierFreq-r11          ARFCN-ValueUTRA,
physCellId-r11           CHOICE {
fdd-r11               PhysCellIdUTRA-FDD,
tdd-r11   PhysCellIdUTRA-TDD
}
}  OPTIONAL
]]
}
```

A format of RSSNR-Range newly added in the foregoing embodiment is as follows:

```
-- ASN1START
RSSNR-Range ::=    INTEGER(0..X)
-- ASN1STOP
```

In this embodiment of the present invention, the RSSNR-Range is only a naming manner and indicates a value range of the RS SNR reported by the terminal. Optionally, X=34. In actual application, another naming manner may be used for the value range of the RS SNR reported by the terminal. The another naming manner used falls within the protection scope of this solution provided that a same physical meaning is indicated.

In actual application, the RS SNR obtained by means of measurement may be reported to the serving base station in another implementation manner. Details are not described herein.

In this embodiment of the present invention, the RS SNR may be an RS SNR of a serving cell of the serving base station, which may be represented as: SNR_serving or SINR_serving. When the terminal supports carrier aggregation, the RS SNR may be an RS SNR of a primary serving cell of a serving cell of the serving base station or an RS SNR of a secondary serving cell of a serving cell of the serving base station, which may be represented as: SNR_pcell or SINR_pcell, or SNR_scell or SINR_scell, or the RS SNR may be an RS SNR of an intra-frequency serving cell of a serving cell of the serving base station or an RS SNR of an inter-frequency serving cell of a serving cell of the serving base station, which may be represented as: SNR_neighbour or SINR_neighbour.

In examples of the foregoing several embodiments, a terminal performs measurement in an idle state. In actual application, the terminal may also perform measurement and recording in a connected state, that is, the terminal may measure and report an RS SNR regardless of whether the terminal is in an idle state or a connected state. A format of an E-UTRAN RRC message is shown as follows:

```
... ...(un-related IEs omitted)
UE-BasedNetwPerfMeasParameters-r10 ::= SEQUENCE {
loggedMeasurementsIdle-r10     ENUMERATED
{supported}
OPTIONAL,
standaloneGNSS-Location-r10  ENUMERATED
{supported}
OPTIONAL
}
rssnrMeasurement-r12    ::= SEQUENCE {
rssnrMeasurement-r12    ENUMERATED
{supported}
OPTIONAL,
......(un-related IEs omitted)
```

If the E-UTRAN RRC message shown above is used, the terminal may feed back, to the serving base station and regardless of whether the terminal is in an idle state or a connected state, information indicating that the terminal has a capability of measuring, recording, and reporting an RS SNR, and supports RS SNR measurement and reporting regardless of whether the terminal is in an idle state or a connected state.

Figure 6:
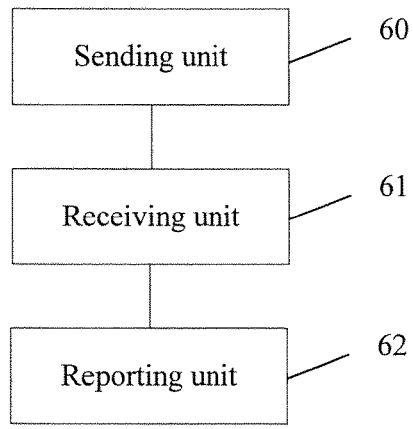
FIG. 6 is a schematic structural diagram of a function of an RS SNR reporting apparatus according to an embodiment of the present invention.

Based on the foregoing technical solutions, referring to FIG. 6, an embodiment of the present invention provides a reference signal signal-to-noise ratio RS SNR reporting apparatus, where the apparatus includes a sending unit 60, a receiving unit 61, and a reporting unit 62.

The sending unit 60 is configured to send a user capability message to a serving base station, where the user capability message carries capability information of measuring, recording, and reporting an RS SNR by a terminal.

The receiving unit 61 is configured to receive a measurement result reporting instruction message sent by the serving base station based on the user capability message.

The reporting unit 62 is configured to report, to the serving base station, an RS SNR obtained by means of measurement.

Optionally, in this embodiment of the present invention, the RS SNR reported by the reporting unit 62 is a ratio of an average linear power value of reference signals RSs that are sent by a target base station and that are received on resource elements REs carrying the RSs to a sum of an average linear power value of signals that are sent by at least one non-target base station and that are received on orthogonal frequency division multiplexing OFDM symbols carrying the RSs.

Optionally, in this embodiment of the present invention, the user capability message sent by the sending unit 60 is an evolved universal terrestrial wireless network E-UTRAN radio resource control RRC message.

Further, in this embodiment of the present invention, the apparatus further includes: a measurement unit 63, where the measurement unit 63 is configured to obtain the RS SNR by means of measurement in the following manner:

receiving a measurement instruction message sent by the serving base station, where the measurement instruction message carries information instructing the terminal to measure an RS SNR of a transmission link between the terminal and the target base station; and measuring the RS SNR of the transmission link between the terminal and the target base station according to the measurement instruction message.

Optionally, in this embodiment of the present invention, the measurement unit 63 is further configured to:

send a measurement complete indication message to the serving base station, where the measurement complete indication message carries information indicating that measurement of the RS SNR of the transmission link between the terminal and the target base station is completed.

Optionally, in this embodiment of the present invention, the measurement instruction message received by the measurement unit 63 is a logged measurement configuration message, and the measurement complete indication message sent by the measurement unit 63 is an RRC connection reconfiguration complete message.

Optionally, in this embodiment of the present invention, the measurement result reporting instruction message received by the receiving unit 61 carries information about the RS SNR reported by the terminal, where the information about the RS SNR reported by the terminal is included in information about all measurement values reported by the terminal, and all the measurement values include at least a measurement value of the RS SNR; or the information about the RS SNR reported by the terminal is included in information about a specified measurement value reported by the terminal, and the specified measurement value includes at least a measurement value of the RS SNR.

Optionally, in this embodiment of the present invention, the measurement result reporting instruction message received by the receiving unit 61 is an RRC user information request message.

Optionally, in this embodiment of the present invention, the reporting unit 62 is specifically configured to:

report, to the serving base station, an RRC user information feedback message carrying the RS SNR obtained by means of measurement.

Optionally, in this embodiment of the present invention, the RS SNR reported by the reporting unit 62 is an RS SNR of a serving cell of the serving base station; or the RS SNR is an RS SNR of a primary serving cell of a serving cell of the serving base station or an RS SNR of a secondary serving cell of a serving cell of the serving base station; or the RS SNR is an RS SNR of an intra-frequency serving cell of a serving cell of the serving base station or an RS SNR of an inter-frequency serving cell of a serving cell of the serving base station.

Figure 7:
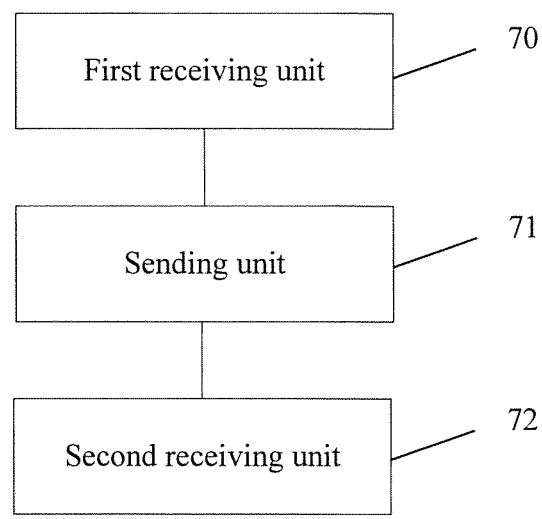
FIG. 7 is a schematic structural diagram of a function of an RS SNR receiving apparatus according to an embodiment of the present invention.

Based on the foregoing technical solutions, referring to FIG. 7, an embodiment of the present invention provides a reference signal signal-to-noise ratio RS SNR receiving apparatus, where the apparatus includes a first receiving unit 70, a sending unit 71, and a second receiving unit 72.

The first receiving unit 70 is configured to receive a user capability message sent by a terminal, where the user capability message carries capability information of measuring, recording, and reporting an RS SNR by the terminal.

The sending unit 71 is configured to send a measurement result reporting instruction message to the terminal based on the user capability message.

The second receiving unit 72 is configured to receive an RS SNR that is obtained by means of measurement and that is reported by the terminal according to the measurement result reporting instruction message.

Optionally, in this embodiment of the present invention, the RS SNR received by the second receiving unit 72 is a ratio of an average linear power value of reference signals RSs that are sent by a target base station and that are received on resource elements REs carrying the RSs to a sum of an average linear power value of signals that are sent by at least one non-target base station and that are received on orthogonal frequency division multiplexing OFDM symbols carrying the RSs.

Optionally, in this embodiment of the present invention, the user capability message received by the first receiving unit 70 is an evolved universal terrestrial wireless network E-UTRAN radio resource control RRC message.

Further, in this embodiment of the present invention, the sending unit 71 is further configured to:

send a measurement instruction message to the terminal, to instruct the terminal to measure an RS SNR of a transmission link between the terminal and the target base station according to the measurement instruction message, where the measurement instruction message carries at least information instructing the terminal to measure the RS SNR of the transmission link between the terminal and the target base station.

Further, in this embodiment of the present invention, the second receiving unit 72 is further configured to:

receive a measurement complete indication message sent by the terminal, where the measurement complete indication message carries at least information indicating that measurement of the RS SNR of the transmission link between the terminal and the target base station is completed.

Optionally, in this embodiment of the present invention, the measurement instruction message sent by the sending unit 71 is a logged measurement configuration message, and the measurement complete indication message received by the second receiving unit 72 is an RRC connection reconfiguration complete message.

Optionally, in this embodiment of the present invention, the measurement result reporting instruction message sent by the sending unit 71 carries at least information about the RS SNR reported by the terminal, where the information about the RS SNR reported by the terminal is included in information about all measurement values reported by the terminal, and all the measurement values include at least a measurement value of the RS SNR; or the information about the RS SNR reported by the terminal is included in information about a specified measurement value reported by the terminal, and the specified measurement value includes at least a measurement value of the RS SNR.

Optionally, in this embodiment of the present invention, the measurement result reporting instruction message sent by the sending unit 71 is an RRC message user information request message.

Optionally, in this embodiment of the present invention, the second receiving unit 72 is specifically configured to:

receive an RRC user information feedback message that is reported by the terminal and that carries at least the RS SNR obtained by means of measurement.

Optionally, in this embodiment of the present invention, the RS SNR received by the second receiving unit 72 is an RS SNR of a serving cell of a serving base station; or the RS SNR is an RS SNR of a primary serving cell of a serving cell of a serving base station or an RS SNR of a secondary serving cell of a serving cell of a serving base station; or the RS SNR is an RS SNR of an intra-frequency serving cell of a serving cell of a serving base station or an RS SNR of an inter-frequency serving cell of a serving cell of a serving base station.

In conclusion, in the embodiments of the present invention, a terminal sends a user capability message to a serving base station, where the user capability message carries capability information of measuring and reporting an RS SNR by the terminal; and the serving base station sends a measurement result reporting instruction message to the terminal based on the user capability message, and then reports, to the serving base station, an RS SNR obtained by means of measurement. In actual application, transmission link quality is reflected in whether a data packet of a user is correctly transmitted, that is, a bit error rate or a packet error rate of data packet transmission, and an SNR may have a direct mapping relationship with the bit error rate or the packet error rate; therefore, in this solution, after the serving base station receives the RS SNR reported by the terminal, accuracy of transmission link quality determined according to the RS SNR is high, so that a network can be effectively optimized.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although the foregoing embodiments of the present invention have been described, persons skilled in the art can make changes and modifications to these embodiments once they learn the basic inventive concept. Therefore, the following claims are intended to be construed as to cover the foregoing embodiments and all changes and modifications falling, within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A reference signal signal-to-noise ratio (RS SNR) reporting method, comprising:
sending a user capability message to a serving base station, wherein the user capability message indicates a capability of a terminal to measure, record, and report an RS SNR;
receiving a measurement result reporting instruction message sent by the serving base station based on the user capability message, the measurement result reporting instruction message comprising a first indicator for instructing whether to report a measured RS SNR, a second indicator for instructing whether to report a measured RS received power (RSRP), and a third indicator for instructing whether to report a measured RS received quality (RSRQ); and
reporting, to the serving base station, either (i) only the measured RS SNR or (ii) the measured RS SNR and at least one of the measured RSRP or the measured RSRQ, according to values of the first, second, and third indicators.

2. The method according to claim 1, wherein the RS SNR is a ratio of an average linear power value of reference signals (RSs) that are sent by a target base station and that are received on resource elements (REs) carrying the RSs to a sum of an average linear power value of signals that are sent by at least one non-target base station and that are received on orthogonal frequency division multiplexing (OFDM) symbols carrying the RSs.

3. The method according to claim 1, wherein the user capability message is an evolved universal terrestrial radio access network (E-UTRAN) radio resource control RRC message.

4. The method according to claim 1, further comprising:
receiving a measurement instruction message sent by the serving base station, wherein the measurement instruction message comprises information instructing the terminal to measure an RS SNR of a transmission link between the terminal and a target base station; and
measuring the RS SNR of the transmission link between the terminal and the target base station according to the measurement instruction message to obtain the measured RS SNR.

5. The method according to claim 4, wherein after measuring the RS SNR of the transmission link between the terminal and the target base station, the method further comprises:
sending a measurement complete indication message to the serving base station, wherein the measurement complete indication message indicates that measurement of the RS SNR of the transmission link between the terminal and the target base station is completed.

6. A reference signal signal-to-noise ratio (RS SNR) receiving method, comprising:
receiving a user capability message sent by a terminal, wherein the user capability message indicates a capability of a tell signal to measure, record, and report an RS SNR;
sending a measurement result reporting instruction message to the terminal based on the user capability message, the measurement result reporting instruction message comprising a first indicator indicating whether to report a measured RS SNR, a second indicator indicating whether to report a measured RS received power (RSRP), and a third indicator indicating whether to report a measured RS received quality (RSRQ); and
receiving either (i) only the measured RS SNR or (ii) the measured RS SNR and at least one of the measured RSRP or the measured RSRQ, which are reported by the terminal according to values of the first, second, and third indicators in the measurement result reporting instruction message.

7. The method according to claim 6, wherein the RS SNR is a ratio of an average linear power value of reference signals (RSs) that are sent by a target base station and that are received on resource elements (REs) carrying the RSs to a sum of an average linear power value of signals that are sent by at least one non-target base station and that are received on orthogonal frequency division multiplexing (OFDM) symbols carrying the RSs.

8. The method according to claim 6, wherein the user capability message is an evolved universal terrestrial radio access network (E-UTRAN) radio resource control (RRC) message.

9. The method according to claim 6, wherein before receiving a measured RS SNR that is reported by the terminal, the method further comprises:
sending a measurement instruction message to the terminal, the measurement instruction message comprising information instructing the terminal to measure an RS SNR of a transmission link between the terminal and a target base station according to the measurement instruction message to obtain the measured RS SNR.

10. The method according to claim 9, where after sending the measurement instruction message to the terminal, the method further comprises:
receiving a measurement complete indication message sent by the terminal, wherein the measurement complete indication message indicates that measurement of the RS SNR of the transmission link between the terminal and the target base station is completed.

11. A reference signal signal-to-noise ratio (RS SNR) reporting apparatus, comprising:
a transmitter, configured to send a user capability message to a serving base station, wherein the user capability message indicates a capability of a terminal to measure, record, and report an RS SNR; and
a receiver, configured to receive a measurement result reporting instruction message sent by the serving base station based on the user capability message, the measurement result reporting instruction message comprising a first indicator for instructing whether to report a measured RS SNR, a second indicator for instructing whether to report a measured RS received power (RSRP), and a third indicator for instructing whether to report a measured RS received quality (RSRQ);
wherein the transmitter is further configured to report, to the serving base station, either (i) only the measured RS SNR or (ii) the measured RS SNR and at least one of the measured RSRP or the measured RSRQ, according to values of the first, second, and third indicators.

12. The apparatus according to claim 11, wherein the RS SNR reported by the transmitter is a ratio of an average linear power value of reference signals (RSs) that are sent by a target base station and that are received on resource elements (REs) carrying the RSs to a sum of an average linear power value of signals that are sent by at least one non-target base station and that are received on orthogonal frequency division multiplexing (OFDM) symbols carrying the RSs.

13. The apparatus according to claim 11, wherein the user capability message sent by the transmitter is an evolved universal terrestrial radio access network (E-UTRAN) radio resource control (RRC) message.

14. The apparatus according to claim 11, further comprising:
a processor;
wherein the receiver is further configured to receive a measurement instruction message sent by the serving base station, wherein the measurement instruction message comprises information instructing the terminal to measure an RS SNR of a transmission link between the tell signal and a target base station; and
wherein the processor is configured to obtain the measured RS SNR by measuring the RS SNR of the transmission link between the terminal and the target base station according to the measurement instruction message.

15. The apparatus according to claim 14, wherein the transmitter is further configured to:
send a measurement complete indication message to the serving base station, wherein the measurement complete indication message indicates that measurement of the RS SNR of the transmission link between the terminal and the target base station is completed.

16. A reference signal signal-to-noise ratio (RS SNR) receiving apparatus, comprising:
a receiver, configured to receive a user capability message sent by a terminal, wherein the user capability message indicates a capability of a terminal to measure, record, and report an RS SNR; and
a transmitter, configured to send a measurement result reporting instruction message to the terminal based on the user capability message, the measurement result reporting instruction message comprising a first indicator indicating whether to report a measured RS SNR, a second indicator indicating whether to report a measured RS received power (RSRP), and a third indicator indicating whether to report a measured RS received quality (RSRQ);
wherein the receiver is further configured to receive either (i) only the measured RS SNR or (ii) the measured RS SNR and at least one of the measured RSRP or the measured RSRQ, which are reported by the terminal according to values of the first, second, and third indicators in the measurement result reporting instruction message.

17. The apparatus according to claim 16, wherein the RS SNR received by the receiver is a ratio of an average linear power value of reference signals (RSs) that are sent by a target base station and that are received on resource elements (REs) carrying the RSs to a sum of an average linear power value of signals that are sent by at least one non-target base station and that are received on orthogonal frequency division multiplexing (OFDM) symbols carrying the RSs.

18. The apparatus according to claim 16, wherein the user capability message received by the receiver is an evolved universal terrestrial radio access network (E-UTRAN) radio resource control (RRC) message.

19. The apparatus according to claim 16, wherein the transmitter is further configured to:
    send a measurement instruction message to the terminal, the measurement instruction message comprising information instructing the terminal to measure an RS SNR of a transmission link between the terminal and a target base station according to the measurement instruction message to obtain the measured RS SNR.

20. The apparatus according to claim 19, wherein the receiver is further configured to:
    receive a measurement complete indication message sent by the terminal, wherein the measurement complete indication message indicates that measurement of the RS SNR of the transmission link between the terminal and the target base station is completed.

* * * * *

UNITED STATES PATENT AND TRADEMARK OFFICE
CERTIFICATE OF CORRECTION

PATENT NO. : 10,425,841 B2  
APPLICATION NO. : 15/235802  
DATED : September 24, 2019  
INVENTOR(S) : Wu et al.

Page 1 of 1

It is certified that error appears in the above-identified patent and that said Letters Patent is hereby corrected as shown below:

In the Claims

Claim 6, Column 31, Line 14: "tell signal" should read -- terminal --.

Claim 14, Column 32, Line 33: "tell signal" should read -- terminal --.

Signed and Sealed this  
Third Day of March, 2020

Andrei Iancu  
*Director of the United States Patent and Trademark Office*